(12) United States Patent
Antonatos et al.

(10) Patent No.: US 10,242,000 B2
(45) Date of Patent: Mar. 26, 2019

(54) CONSISTENT UTILITY-PRESERVING MASKING OF A DATASET IN A DISTRIBUTED ENVIRONMENT

(71) Applicant: International Business Machines Corporation, Armonk, NY (US)

(72) Inventors: Spyridon Antonatos, Blanchardstown (IE); Stefano Braghin, Blanchardstown (IE); Aris Gkoulalas-Divanis, Blanchardstown (IE); Olivier Verscheure, Meath (IE)

(73) Assignee: International Business Machines Corporation, Armonk, NY (US)

(*) Notice: Subject to any disclaimer, the term of this patent is extended or adjusted under 35 U.S.C. 154(b) by 109 days.

(21) Appl. No.: 15/166,946

(22) Filed: May 27, 2016

(65) Prior Publication Data
US 2017/0344495 A1    Nov. 30, 2017

(51) Int. Cl.
*G06F 12/14* (2006.01)
*G06F 17/30* (2006.01)

(52) U.S. Cl.
CPC ........ *G06F 17/30* (2013.01); *H04L 2209/043* (2013.01); *H04L 2209/16* (2013.01)

(58) Field of Classification Search
None
See application file for complete search history.

(56) References Cited

U.S. PATENT DOCUMENTS

| 5,323,464 | A | 6/1994 | Elander et al. |
| 7,200,757 | B1 | 4/2007 | Muralidar et al. |
| 2007/0110224 | A1 | 5/2007 | Gumpel et al. |
| 2008/0065665 | A1 | 3/2008 | Pomroy et al. |
| 2008/0118150 | A1 | 5/2008 | Balakrishnan et al. |
| 2009/0049512 | A1 | 2/2009 | Manickam et al. |
| 2009/0132419 | A1 | 5/2009 | Grammer et al. |
| 2009/0204631 | A1 | 8/2009 | Pomroy et al. |
| 2012/0030165 | A1 | 2/2012 | Guirguis et al. |
| 2012/0272329 | A1 | 10/2012 | Grammer et al. |
| 2013/0144901 | A1* | 6/2013 | Ho .......... G06F 17/30554 707/769 |

(Continued)

OTHER PUBLICATIONS

IBM, "Data Masking Method for Secured Data", http://ip.com/IPCOM/000185251D, Jul. 17, 2009, 6 pages.

(Continued)

*Primary Examiner* — Brandon S Hoffman
(74) *Attorney, Agent, or Firm* — Scully, Scott, Murphy & Presser, P.C.; Kurt P. Goudy, Esq.

(57) ABSTRACT

Distributed, consistent utility-preserving data masking is provided by retrieving an original value from a data table; initiating a communication with a mapping service to ascertain whether or not a masking table of the mapping service includes a fictionalized value associated with the original value; when the masking table does not include a fictionalized value associated with the original value, producing a fictionalized value for the original value wherein the fictionalized value preserves at least one utility function of the original value, updating the mapping service to include the fictionalized value in the masking table, and applying a first masking operation by replacing the retrieved original value with the fictionalized value.

20 Claims, 13 Drawing Sheets

(56) References Cited

U.S. PATENT DOCUMENTS

2015/0113656 A1    4/2015  D'Costa et al.
2015/0324607 A1*  11/2015  Mushkatblat ....... G06F 21/6254
                                                         726/26

OTHER PUBLICATIONS

Anonymously, "Automated Discovery and Masking of Sensitive Data", http://ip.com/IPOCOM/000240280D, Jan. 21, 2015, 6 pages.
Informatica, "Protecting Data Privacy by Persistently Masking Sensitive Information", https://www.pacificdataintegrators.com/uploads/Protect-Data-Privacy-by-Persistently-Masking-Sensitive-Information.pdf, Copyright 2015, 3 pages.
Camouflage, "Database Unity Framework", https://identitymethods.co.uk/wp-content/uploads/download/CAMOUFLAGE-PRODUCT-SHEET-DATA-UNITY-IM-VER.pdf, Camouflage Software, Inc., Copyright 2015, 3 pages.
Foukarakis, M., et al.; "Deep Packet Anonymization"; EUROSEC '09, Nuremberg, Germany, Jan. 2009, 7 pages.
Armstrong, M.P., et al., "Geographically Masking Health Data to Preserve Confidentiality", Statistics in Medicine, Statist. Med., Received Apr. 1997, Accepted Apr. 1998, Mar. 1999, vol. 18, pp. 497-525.
Cheng, L., et al., "Efficient Parallel Dictionary Encoding for RDF Data", Seventeenth International Workshop on the Web and Databases (WebDB 2014), Jun. 22, 2014, 7 pages.
Johnson, D.B., "Design of the Commercial Data Masking Facility Data Privacy Algorithm", 1st Conf. Computer & Comm. Security '93, Nov. 1993, pp. 93-96.

* cited by examiner

CONSISTENT UTILITY-PRESERVING MASKING OF A DATASET IN A DISTRIBUTED ENVIRONMENT

FIELD

The present application relates generally to methods and apparatuses for obfuscating sensitive data and, more particularly, to techniques for masking sensitive data to protect individuals from re-identification and/or sensitive information disclosure attacks while preserving data utility.

BACKGROUND

Data masking is an essential component for privacy-preserving data sharing. Across various industries, sensitive data may be shared or disseminated beyond secure corporate boundaries. For purposes of illustration, such data may be related to customers, patients, suppliers, or vendors. Initiatives such as outsourcing and off-shoring have created opportunities for sensitive data to be accessed by unauthorized parties, thereby placing individuals' confidentiality at risk. In many cases, these unauthorized parties do not need to access true, actual, or accurate data values in order to properly conduct their job functions. Examples of sensitive data include, but are not limited to, names, addresses, network identifiers, social security numbers, medical information, and financial data. In an effort to ensure privacy, organizations and institutes around the world perform data masking to ensure that sensitive values are not disclosed in the form of person-specific data. Some existing data masking solutions are tailored to operate in a single-machine (single thread) environment, whereas other solutions are designed for a distributed environment. A useful feature in data masking regards an offering of consistency, where multiple appearances of an original data value in a dataset become transformed to an identical masked data value.

Existing single-machine (single-thread), consistent data masking solutions cannot be ported to a distributed environment, which limits the scalability and usability of these schemes. Existing distributed solutions, on the other hand, provide consistency by supporting only the application of a very limited set of masking operations such as deterministic hashing, encoding, or encryption using predefined keys. Yet another conventional consistent data masking approach uses static dictionary-based mapping in a distributed computing environment, where a given original value is always masked using the same pre-determined masked value. However, all of these conventional approaches to the offering of distributed consistent data masking are highly detrimental to the usefulness and statistical value of the masked data. For example, masking an original value, such as the name of a street, by always using a pre-determined masked value of "abcd", fails to retain any useful characteristics of the original data.

Conventional data masking techniques are often implemented independently in an ad hoc and subjective manner for each of a plurality of applications on a distributed computing system. Such an ad hoc data masking approach requires time-consuming iterative trial and error cycles that are not repeatable. Moreover, multiple subject matter experts using the aforementioned subjective data masking approach may independently develop and implement inconsistent data masking techniques on multiple interfacing applications. These multiple applications may work properly and effectively so long as the applications are operated independently of one other. However, when data is exchanged between multiple interfacing applications, data inconsistencies introduced by the inconsistent data masking techniques may cause operational and functional failures.

Conventional data masking approaches present difficulties in terms of properly and completely testing software applications. Due to the fact that conventional masking approaches simply replace sensitive data with non-intelligent and repetitive data, the masked data is not meaningful or useful. For example, assume that a conventional masking approach replaces all alphabetic characters with the letter "X" and all numeric characters with the number "9", or replaces selected characters with other characters that are selected using a randomization scheme. Because the masked data is no longer meaningful or useful, some of the logical paths in the application cannot be tested (i.e., full functional testing is not possible), leaving the application vulnerable to error when true data values are introduced in production. Thus, there exists a need to overcome at least one of the preceding deficiencies and limitations of the related art.

SUMMARY

The following summary is merely intended to be exemplary. The summary is not intended to limit the scope of the claims. A method for performing distributed, consistent utility-preserving data masking, in one aspect, may comprise a first processor of a plurality of processors retrieving an original value from a data table; the first processor initiating a communication with a mapping service to ascertain whether or not a masking table of the mapping service includes a fictionalized value associated with the original value; when the masking table does not include a fictionalized value associated with the original value, the first processor producing a fictionalized value for the original value wherein the fictionalized value preserves at least one utility function of the original value, updating the mapping service to include the fictionalized value in the masking table, and applying a first masking operation by replacing the retrieved original value with the produced fictionalized value. When the masking table includes the fictionalized value associated with the original value, the first processor replaces the original value retrieved from the data table with the fictionalized value from the masking table. The same operation is repeated concurrently by a plurality of processors for the different original values in the data table. When a race condition does not exist, the first processor processes the original value in the dataset once.

According to a further set of embodiments, the method comprises, in response to an identical data value appearing multiple times in a specific context of a plurality of contexts in a first dataset, masking the identical value consistently across all occurrences of the identical data value within the same context. A context may comprise at least one of a scope of an attribute, a scope of a data session, or a customer-purpose combination. The scope of an attribute comprises all identical values within a first attribute being consistently masked, but identical values appearing across any of a plurality of attributes not being masked to the same value. For clarity, assume attributes A and B and data values A=1 and B=1 for some records in a data table. Consistent masking (in the scope of an attribute) for attribute A may mask original value A=1 to 10. At the same time, the consistent masking of attribute B may mask the original value B=1 to 5. Hence, although value 1 appears both in original records of attributes A and B, this value is masked differently (but still consistently at an attribute scope) within each attribute, but not across attributes. The scope of the data session performs consistent masking within a first data session but not across a second data session different from the first data session. In each of a plurality of data sessions, the original values are masked consistently, but the values to which they are masked differ for each data session. The customer-purpose combination consistently masks all identical original values in response to a predetermined combination of a customer and a purpose. Given two different customer-purpose combinations, the masked data values that will be produced from the original data values will differ, but the masking will be consistent for each customer-purpose combination.

An apparatus for performing distributed, consistent utility-preserving data masking, in another aspect, may comprise at least a first processor of a plurality of processors configured for communicating with a mapping service. The first processor retrieves an original value from a data table and initiates a communication with the mapping service to ascertain whether or not a masking table of the mapping service includes a fictionalized value associated with the original value. When the masking table does not include a fictionalized value associated with the original value, the first processor produces a fictionalized value for the original value wherein the fictionalized value preserves at least one utility function of the original value, updates the mapping service to include the fictionalized value in the masking table, and applies a first masking operation by replacing the retrieved original value with the produced fictionalized value. When the masking table includes the fictionalized value associated with the original value, the first processor replaces the original value retrieved from the data table with the fictionalized value from the masking table. When a race condition does not exist, the first processor processes the original value in the dataset once.

According to a further set of embodiments, in response to an identical data value appearing multiple times in a specific context of a plurality of contexts in a first dataset, the identical value is masked consistently across all occurrences of the identical data value within the same context. A context may comprise at least one of a scope of an attribute, a scope of a data session, or a customer-purpose combination. The scope of an attribute comprises all identical values within a first attribute being consistently masked, but identical values appearing across any of a plurality of attributes not being masked to the same value. The scope of the data session performs consistent masking within a first data session but not across a second data session different from the first data session. In each of a plurality of data sessions, the original values are masked consistently, but the values to which they are masked differ for each data session. The customer-purpose combination consistently masks all identical original values in response to a predetermined combination of a customer and a purpose. Given two different customer-purpose combinations, the masked data values that will be produced from the original data values will differ, but the masking will be consistent for each customer-purpose combination.

A computer program product for performing distributed, consistent utility-preserving data masking, the computer program product comprising a computer-readable storage medium having a computer-readable program stored therein, wherein the computer-readable program, when executed on a computer system comprising at least a first processor of a plurality of processors, causes the computer system to perform: retrieving, at the first processor, an original value from a data table; and the first processor initiating a communication with a mapping service to ascertain whether or not a masking table of the mapping service includes a fictionalized value associated with the original value. When the masking table does not include a fictionalized value associated with the original value, the first processor produces a fictionalized value for the original value wherein the fictionalized value preserves at least one utility function of the original value, updates the mapping service to include the fictionalized value in the masking table, and applies a first masking operation by replacing the retrieved original value with the produced fictionalized value. When the masking table includes the fictionalized value associated with the original value, the first processor replaces the original value retrieved from the data table with the fictionalized value from the masking table. When a race condition does not exist, the first processor processes the original value in the dataset once.

According to a further set of embodiments, in response to an identical data value appearing multiple times in a specific context of a plurality of contexts in a first dataset, the identical value is masked consistently across all occurrences of the identical data value within the same context. A context may comprise at least one of a scope of an attribute, a scope of a data session, or a customer-purpose combination. The scope of an attribute comprises all identical values within a first attribute being consistently masked, but identical values appearing across any of a plurality of attributes not being masked to the same value. The scope of the data session performs consistent masking within a first data session but not across a second data session different from the first data session. In each of a plurality of data sessions, the original values are masked consistently, but the values to which they are masked differ for each data session. The customer-purpose combination consistently masks all identical original values in response to a predetermined combination of a customer and a purpose. Given two different customer-purpose combinations, the masked data values that will be produced from the original data values will differ, but the masking will be consistent for each customer-purpose combination.

BRIEF DESCRIPTION OF THE SEVERAL VIEWS OF THE DRAWINGS

The foregoing aspects and other features are explained in the following description, taken in connection with the accompanying drawings, wherein.

DETAILED DESCRIPTION

Figure 1:
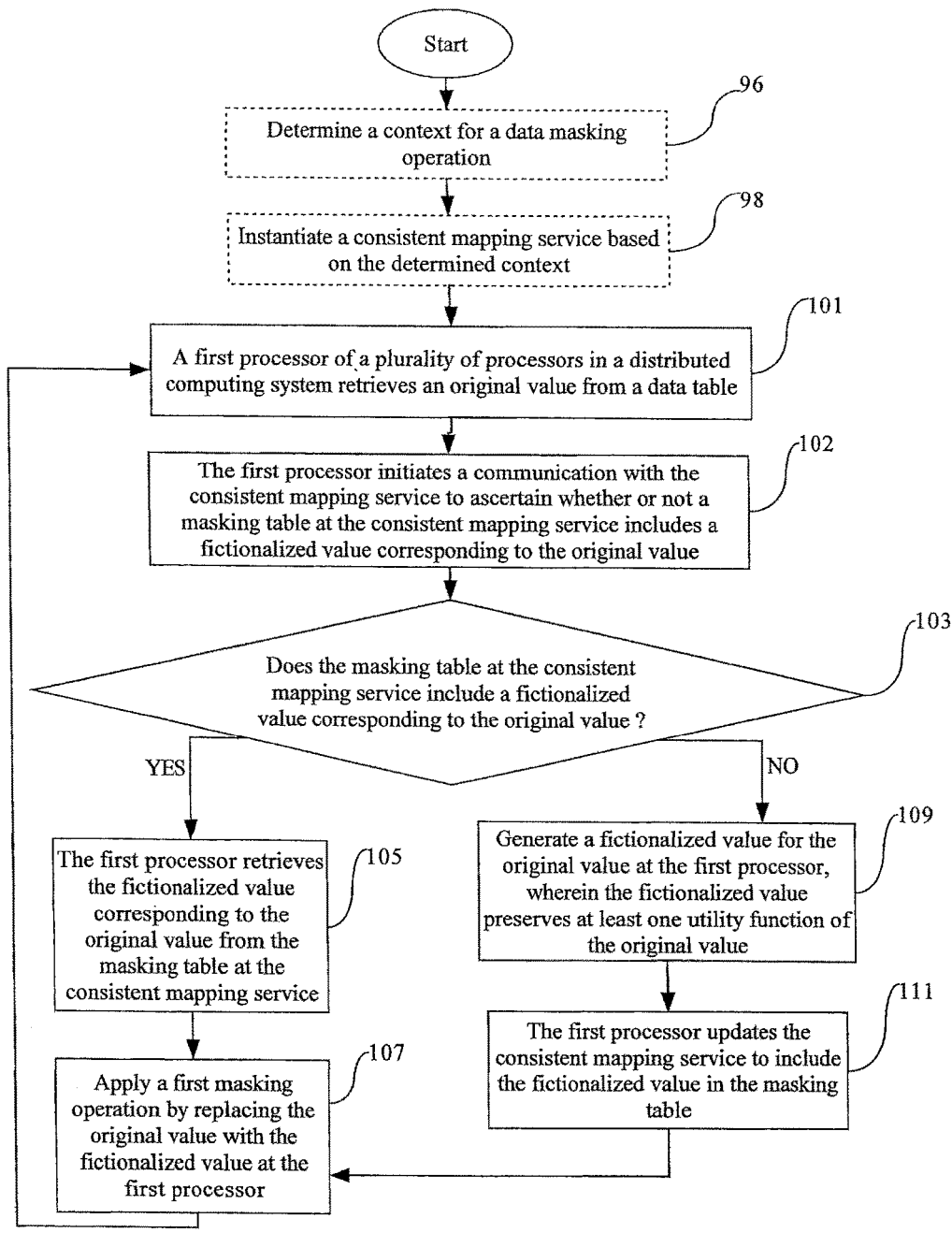
FIG. 1 is a flowchart illustrating a first exemplary method for performing distributed, consistent utility-preserving data masking.

FIG. 1 is a flowchart illustrating a first exemplary method for performing distributed, consistent utility-preserving data masking. The procedure commences either at block 101, or at optional block 96. At optional block 96, a context is determined for a data masking operation. Then, at optional block 98, a consistent mapping service is instantiated based upon the determined context. Alternatively or additionally, a plurality of mapping services may be instantiated based upon the determined context. Accordingly, in response to an identical data value appearing multiple times in a specific context of a plurality of contexts in a first dataset, the identical value is masked consistently across all occurrences of the identical data value within the same context. A context may comprise at least one of a scope of an attribute, a scope of a data session, or a customer-purpose combination. The scope of an attribute comprises all identical values within a first attribute being consistently masked, but identical values appearing across any of a plurality of attributes not including the first attribute not being masked consistently. The scope of the data session provides consistent masking within a first data session but not across a second data session different from the first data session. In each of a plurality of data sessions, the original values are masked consistently, but the values to which they are masked differ for each data session. The customer-purpose combination consistently masks all identical values in response to a predetermined combination of a customer and a purpose. Given two different customer-purpose combinations, the masked data values that will be produced from the original data values will differ, but the masking will be consistent for each customer-purpose combination.

The operational sequence of FIG. 1 progresses from block 98 to block 101 where a first processor of a plurality of processors in a distributed computing system retrieves an original value from a data table. For purposes of illustration, the table may comprise a plurality of columns Next, at block 102, the first processor initiates a communication with a consistent mapping service to ascertain whether or not a masking table at the consistent mapping service includes a fictionalized value corresponding to the original value. The consistent mapping service is configured for maintaining a mapping between each of a respective plurality of original values and each of a corresponding plurality of fictionalized values, illustratively on a per-column basis.

The operational sequence progresses to block 103 where a test is performed to ascertain whether or not the masking table at the consistent mapping service includes a fictionalized value corresponding to the original value. If not, a fictionalized value for the original value is produced at the first processor (block 109). The fictionalized value preserves at least one utility function of the original value. Illustratively, block 109 may be performed at the first processor based on a user-defined utility-preserving data masking operation. For example, a user-defined utility-preserving data masking operation may require masking a telephone number by preserving only the country code and randomizing the remaining digits, or by preserving the country code and the area code and randomizing the remaining digits. Likewise, a user-defined utility-preserving data masking operation may require masking a specific street address while preserving neighborhood, county, city, or country information. Next, at block 111, the first processor updates the masking table stored by the consistent mapping service to include the fictionalized value for the corresponding original value. Subsequently, the first processor applies a first masking operation by replacing the original value in the data table (dataset) with the fictionalized value (block 107). Program control then loops back to block 101.

The affirmative branch from block 103 leads to block 105 where the first processor retrieves the fictionalized value corresponding to the original value from the masking table at the consistent mapping service. The first processor applies a first masking operation by replacing the original value with the fictionalized value (block 107). Program control then loops back to block 101.

Optionally, at least one processor is operatively coupled to a local cache configured for storing mappings between original values and fictionalized values as received from the consistent mapping service, so as to reduce communication overhead. Optionally, upon receiving a fictionalized value for an original value from the consistent mapping service, at least one processor masks all occurrences of the original value with the fictionalized value in a column corresponding to the original value.

The method of FIG. 1 performs distributed utility-preserving consistent data masking based on data values appearing in a dataset, and agnostic to potential relations holding for the dataset. Optionally, a set of mappings between original values and fictionalized values for a first dataset may be applied to a second dataset to support consistent and persistent masking across a plurality of datasets. Accordingly, the method of FIG. 1 can support consistency across different datasets and is more generic than existing approaches. The method of FIG. 1 can support any type of data masking provider while maintaining the usefulness and utility of the masked data.

Figure 2:
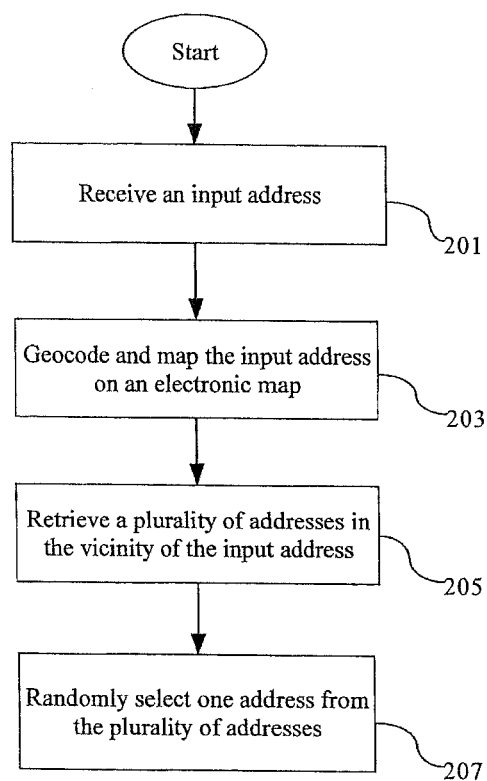
FIG. 2 is a flowchart illustrating an exemplary process for generating a fictionalized value for an original data value while preserving at least one utility function of the original value.

FIG. 2 is a flowchart illustrating an exemplary process for generating a fictionalized value for an original data value while preserving at least one utility function of the original data value. This exemplary process may be used, for example, to perform block 109 of FIG. 1. The process of FIG. 2 commences at block 201 where an input postal address is received. Next, the input postal address is geo-coded and mapped on an electronic map (block 203). A plurality of postal addresses in the vicinity of the input postal address are retrieved from the electronic map (block 205). One address is then randomly selected from the plurality of addresses (block 207) to become the fictionalized value with which the original value will be replaced consistently in the data table (dataset).

At block 207, the utility and usefulness of the postal address is preserved because the masked address is in the same neighborhood as the input postal address. To further preserve data utility, the foregoing random selection process may be further refined to only retrieve addresses in the same street as the input address. However, privacy is maintained because person-specific information is masked. A similar approach may be used to mask e-mail addresses in a utility-preserving manner For example, only the top-level domain of an email address may be retained, such that an original email address of employee@ie.ibm.com is masked to a fictionalized value of randomstring@xyz.wdf.com. Alternatively or additionally, the masking may utilize two-level domain preservation where the original email address of employee@ie.ibm.com is masked to a fictionalized value of randomstring@xyz.ibm.com.

Figure 3:
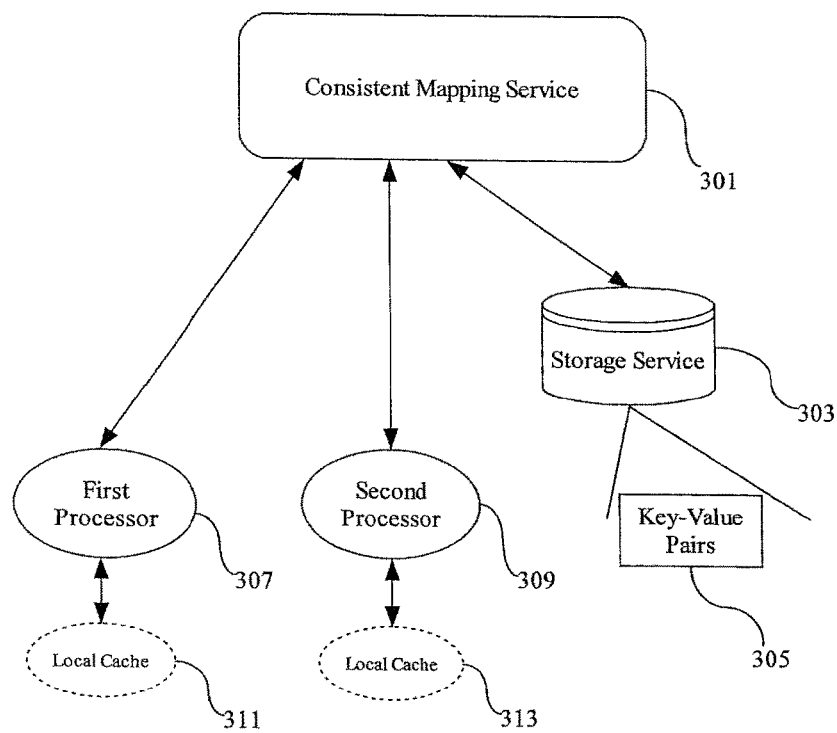
FIG. 3 is a hardware block diagram of a first exemplary system for performing distributed, consistent utility-preserving data masking.

FIG. 3 is a hardware block diagram of a first exemplary system for performing distributed, consistent utility-preserving data masking. A consistent mapping service 301 is configured for maintaining a mapping between each of a respective plurality of original values and each of a corresponding plurality of fictionalized values, illustratively on a per-column basis. Thus, a first mapping service or a first set of mapping services may maintain mappings between original and fictionalized values for columns A, B, and C of a data table. Likewise, a second mapping service or a second set of mapping services may maintain mappings between original and fictionalized values for columns D, E, and F of the data table.

The consistent mapping service 301 may be implemented using one or more internal processors coupled to one or more computer-readable data storage devices. Alternatively, or additionally, the consistent mapping service 301 may be operatively coupled to a storage service 303. The consistent mapping service 301 is operatively coupled to a plurality of remote processors including at least a first processor 307 and a second processor 309. Optionally, the first processor 307 is equipped with a local cache 311, and the second processor 309 is equipped with a local cache 313. In general, there may be a large number of processors available, and each of the processors may be equipped with a local cache.

The first processor 307 retrieves an original value from a data table, and checks the local cache 311 to ascertain whether or not the local cache 311 includes a fictionalized value corresponding to the original value. If not, the first processor 307 interacts with the consistent mapping service 301 to request a fictionalized value corresponding to the original value. The consistent mapping service 301 performs a lookup operation on the storage service 303 to locate a fictionalized value corresponding to the original value and, if the fictionalized value is located, the consistent mapping service 301 sends the fictionalized value to the first processor 307. The storage service 303 may store information in the form of a plurality of key-value (original data value, fictionalized data value) pairs 305.

When the consistent mapping service 301 does not locate a fictionalized value corresponding to the original value, the first processor 307 may compute a fictionalized value for the original value. The first processor 307 sends the computed fictionalized value to the consistent mapping service 301 where the computed fictionalized value may be either accepted or rejected by the consistent mapping service 301. If the proposed fictionalized value is rejected, the consistent mapping service 301 generates a new fictionalized value and sends the new fictionalized value to the first processor 307. Optionally, the local cache 313 of the second processor 309 may be updated with any response received from the consistent mapping service 301, such as the new fictionalized value.

The system of FIG. 3 makes no implicit assumptions regarding the number of threads corresponding to each of the plurality of processors including the first processor 307 and the second processor 309. For example, the first processor 307 and the second processor 309 may each be implemented using any of a variety of configurations spanning single-core/thread machines to clusters of high-performance multi-core/multi-threaded machines. The first and second processors 307, 309 may be configured for supporting any kind of utility-preserving data masking operation including, but not limited to, mapping, hashing, encoding, and encryption privacy providers. This support also allows maximizing the utility of the masked data because the fictionalized values are computed on-the-fly, based on a specific input data set, instead of being pre-computed based on generic rules. Accordingly, the system of FIG. 3 is highly scalable, as the consistent mapping service 301 may be provided by multiple instances each handling a different set of columns or values of a data set.

Figure 4:
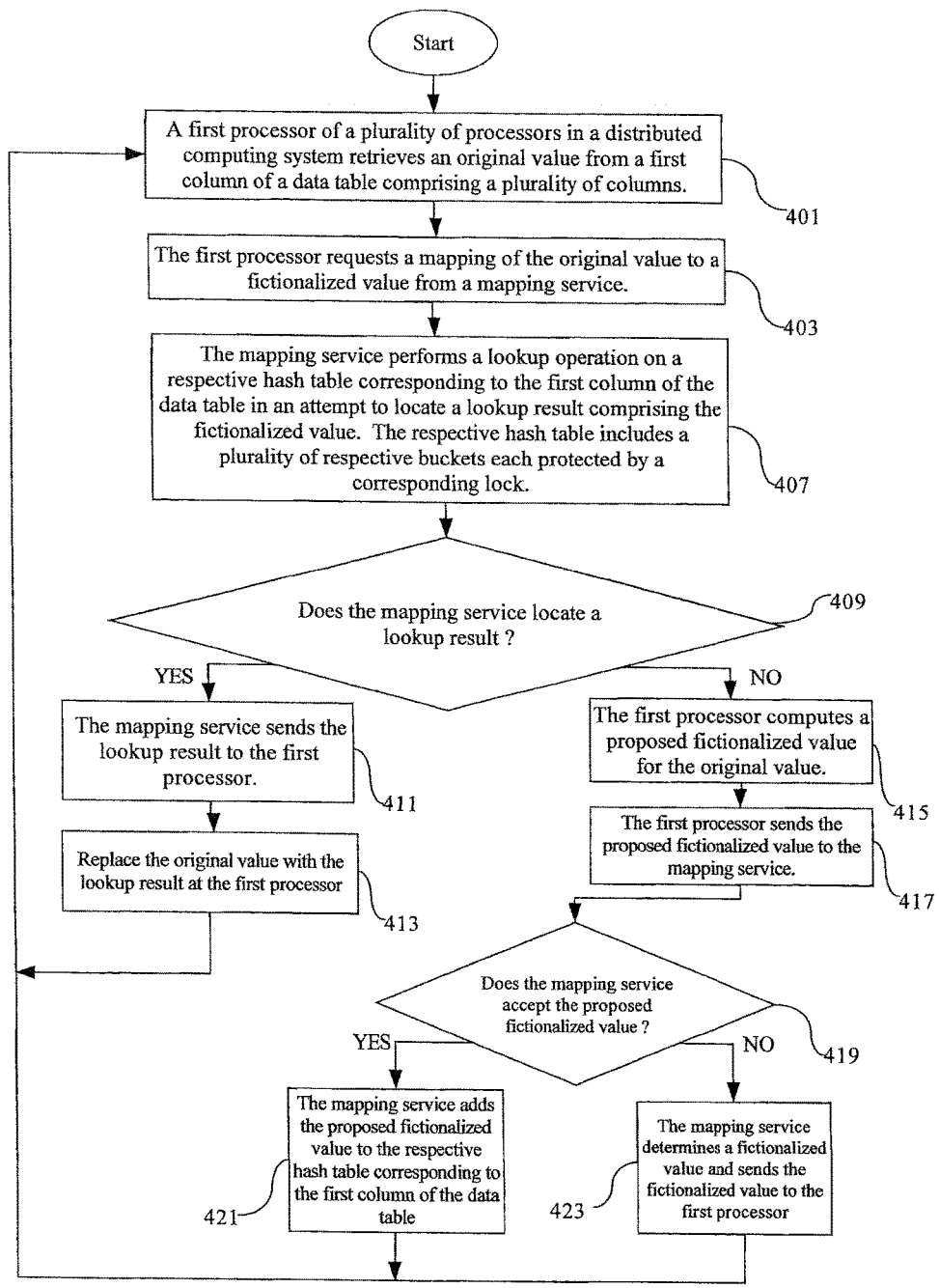
FIG. 4 is a flowchart illustrating a second exemplary method for performing distributed, consistent utility-preserving data masking.
Figure 5:
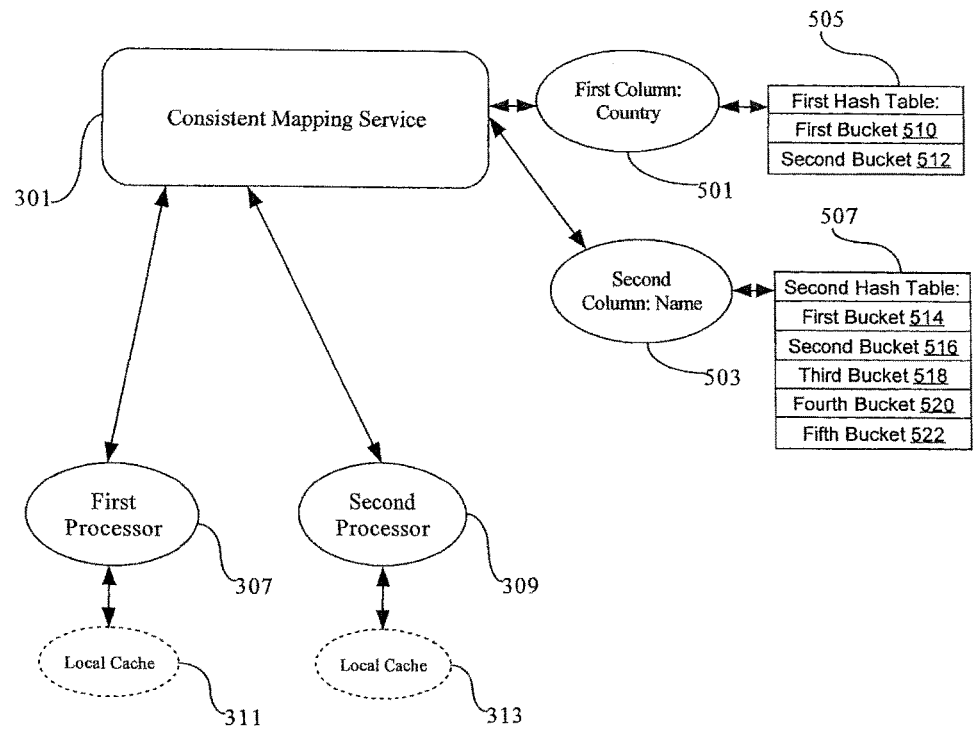
FIG. 5 is a hardware block diagram of an exemplary system for performing the method of FIG. 4.

FIG. 4 is a flowchart illustrating a second exemplary method for performing distributed, consistent utility-preserving data masking, and FIG. 5 is a hardware block diagram of an exemplary system for performing the method of FIG. 4. At block 401, a first processor 307 (FIG. 5) of a plurality of processors in a distributed computing system retrieves an original value from a first column of a data table comprising a plurality of columns. Optionally, the first processor 307 checks the local cache 311 in an attempt to locate a fictionalized value associated with the retrieved original value. Next, at block 403 (FIG. 4), the first processor 307 (FIG. 5) requests a mapping of the original value to a fictionalized value from the consistent mapping service 301.

The program progresses to block 407 (FIG. 4) where the consistent mapping service 301 (FIG. 5) performs a lookup operation on a first hash table 505 corresponding to a first column 501 of the data table in an attempt to locate a lookup result comprising the fictionalized value. The first hash table 505 includes a plurality of respective buckets each protected by a corresponding lock, such as a first bucket 510 and a second bucket 512. For example, the first column 501 may represent a country, and a second column 503 may represent a name A second hash table 507 includes a plurality of respective buckets each protected by a corresponding lock, such as a first bucket 514, a second bucket 516, a third bucket 518, a fourth bucket 520, and a fifth bucket 522. The size of the first hash table 505 is based upon the cardinality of the distinct values in the first column 501. Likewise, the size of the second hash table 507 is based upon the cardinality of the distinct values in the second column 503.

The operational sequence of FIG. 4 progresses to block 409 where a test is performed to ascertain whether or not the consistent mapping service 301 (FIG. 5) locates a lookup result. If so, the consistent mapping service 301 sends the lookup result to the first processor 307 at block 411 (FIG. 4). Then, at block 413, the original value in the data table is replaced with the lookup result at the first processor 307 (FIG. 5). The operational sequence of FIG. 4 then loops back to block 401.

The negative branch from block 409 leads to block 415 where the first processor 307 (FIG. 5) computes a proposed fictionalized value for the original value. Next, at block 417 (FIG. 4), the first processor 307 (FIG. 5) sends the proposed fictionalized value to the consistent mapping service 301. At block 419 (FIG. 4), a test is performed to ascertain whether or not the consistent mapping service 301 (FIG. 5) accepts the proposed fictionalized value. If not, the program progresses to block 423 (FIG. 4) where the consistent mapping service 301 (FIG. 5) determines a fictionalized value and sends the fictionalized value to the first processor 307. The affirmative branch from block 419 (FIG. 4) leads to block 421 where the consistent mapping service 301 (FIG. 5) adds the proposed fictionalized value to the first hash table 505 corresponding to the first column 501 of the data table, and the program then loops back to block 401 (FIG. 4). Optionally, the first and second processors 307, 309 (FIG. 5) update their local cache 311 and 313 in response to any responses that are received from the consistent mapping service 301.

Pursuant to the procedure of FIG. 4, the consistent mapping service 301 (FIG. 5) performs a value-based locking on a per-column basis to minimize resource contention. For each column (such as the first column 501 and the second column 503), a dynamically-sized hash table (such as the first hash table 505 and the second hash table 507, respectively) protected by locks (semaphores) on each bucket 510, 512, 514, 516, 518, 520, and 522 eliminates race conditions.

Figure 6:
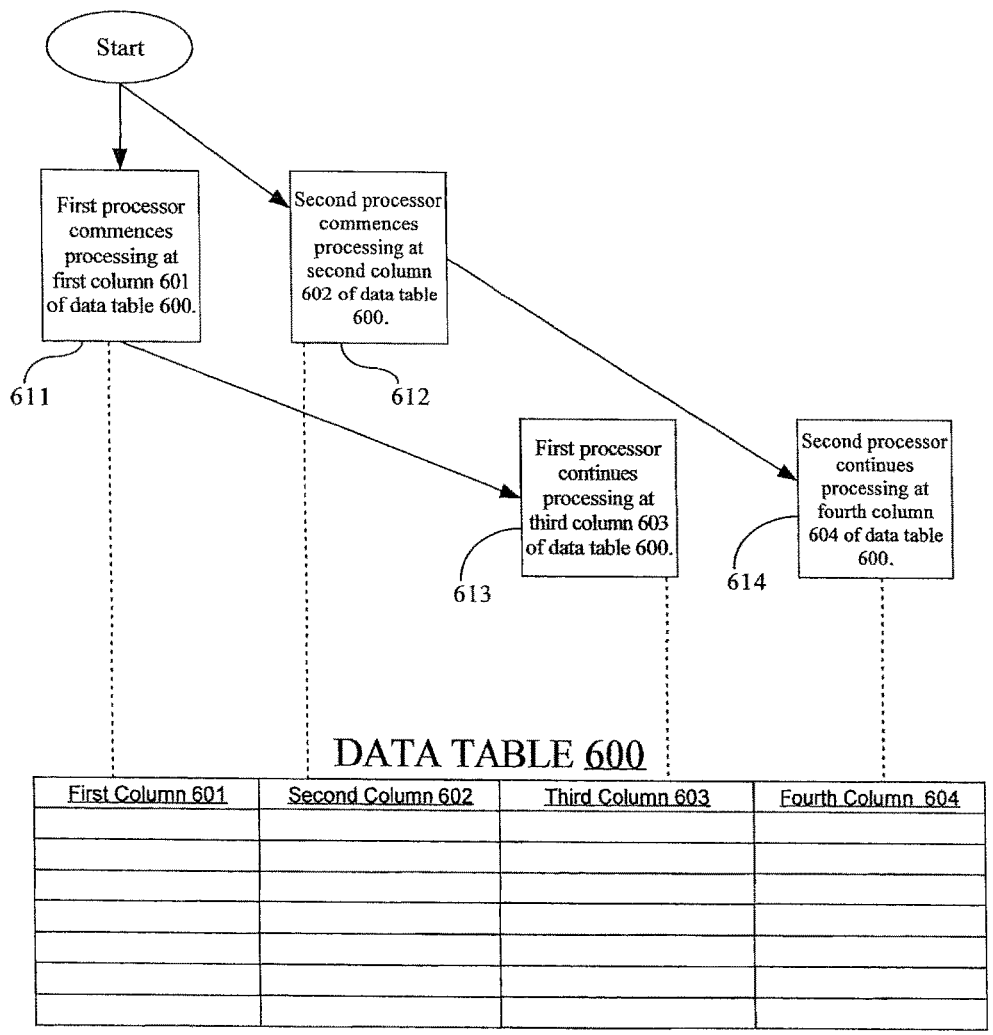
FIG. 6 is a data flow diagram illustrating a third exemplary method for performing distributed, consistent utility-preserving data masking.

FIG. 6 is a data flow diagram illustrating a third exemplary method for performing distributed, consistent utility-preserving data masking. As an additional measure to reduce resource contention, each processor thread (first processor 307 and second processor 309) applies data masking operations in a round-robin fashion starting from a different column of data, such that the minimum number of processors operate on the same column of the data set at any given time. A multi-phase communication protocol between processors 307, 309 and the consistent mapping service 301 is used to retrieve and update mapping between original and fictionalized values.

The procedure of FIG. 6 commences at block 611 where the first processor 307 (FIG. 5) commences processing at a first column 601 (FIG. 6) of a data table 600. Block 611 is performed substantially contemporaneously with block 612. At block 612, the second processor 309 (FIG. 5) commences processing at a second column 602 (FIG. 6) of the data table 600. Once the first processor 307 (FIG. 5) completes processing of the first column 601 (FIG. 6) at block 611, the first processor 307 (FIG. 5) commences processing at the third column 603 (FIG. 6) of the data table 600. Illustratively, there may be a multiplicity of processors (more than two) in an exemplary system, and once any of the multiplicity of processors finishes operating on a column of data, it is assigned to a column where no other processor operates/has operated. In the example of FIG. 5, once the second processor 309 (FIG. 5) completes processing of the second column 602 (FIG. 6) at block 612, the second processor 309 (FIG. 5) commences processing at the fourth column 604 (FIG. 6) of the data table 600.

Figure 7:
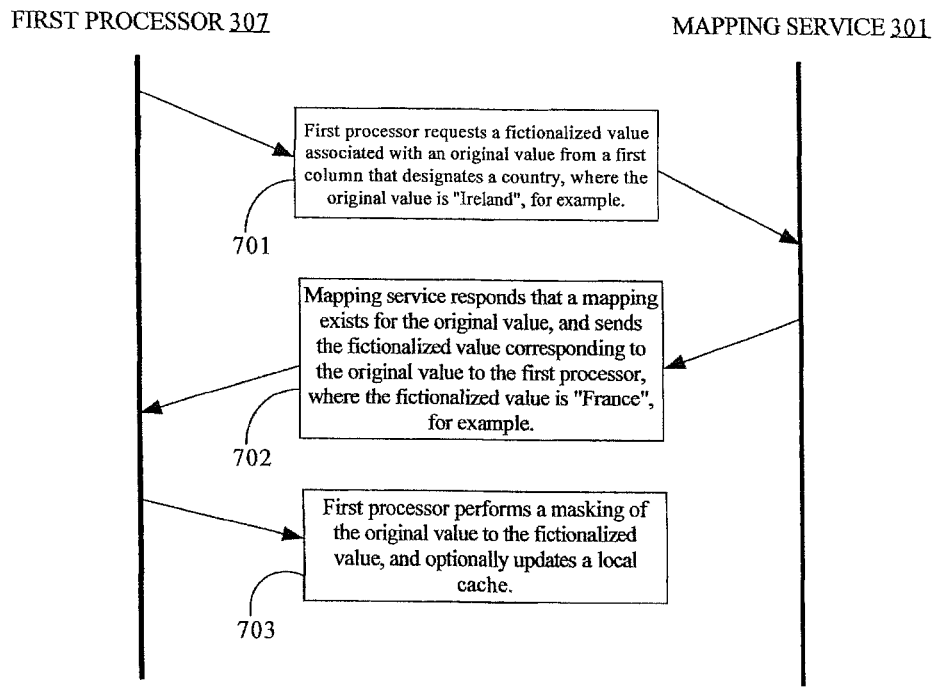
FIG. 7 is a data flow diagram illustrating a fourth exemplary method for performing distributed, consistent utility-preserving data masking.

FIG. 7 is a data flow diagram illustrating a fourth exemplary method for performing distributed, consistent utility-preserving data masking. This method is applicable in situations where a processor requests a fictionalized value corresponding to an original value, and such an original value exists in the mapping service 301 (FIG. 7). The method commences at block 701 where the first processor 307 (FIG. 7) requests a fictionalized value associated with an original value from a first column that designates a country. For example, assume that the original value is "Ireland". At block 702, the mapping service 301 responds that a mapping exists for the original value, and the mapping service sends the fictionalized value corresponding to the original value to the first processor 307. For example, assume that the fictionalized value is "France". Next, at block 703, the first processor 307 performs a masking of the original value ("Ireland") to the fictionalized value ("France"), and optionally updates a local cache.

Figure 8:
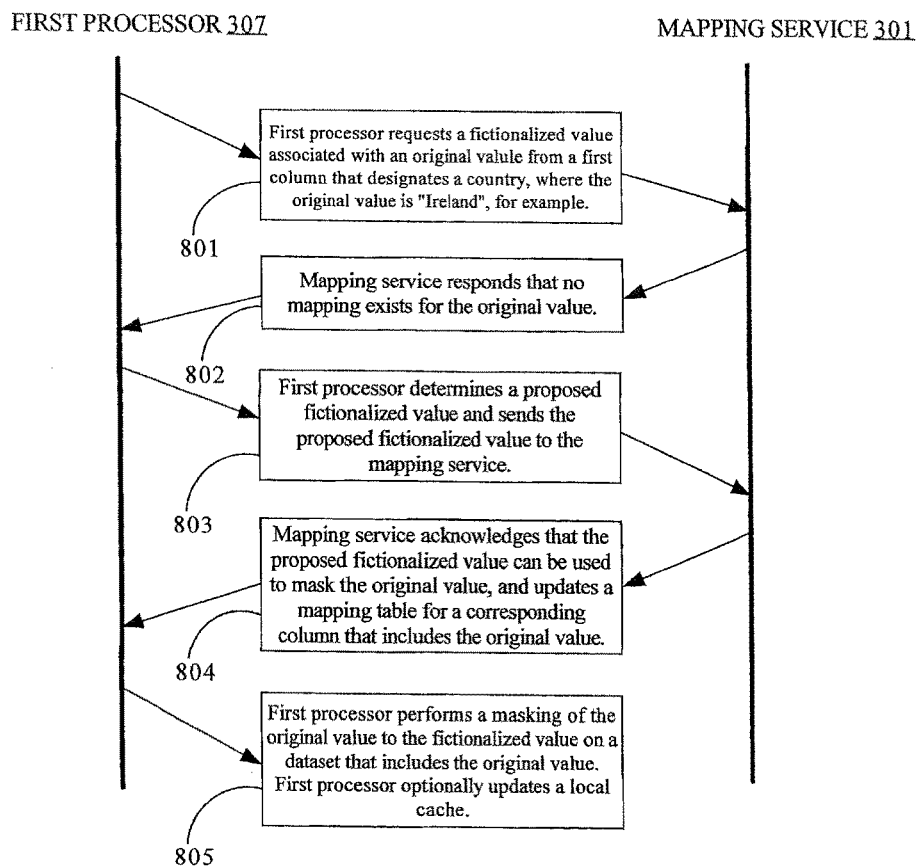
FIG. 8 is a data flow diagram illustrating a fifth exemplary method for performing distributed, consistent utility-preserving data masking.

FIG. 8 is a data flow diagram illustrating a fifth exemplary method for performing distributed, consistent utility-preserving data masking. This method is applicable in situations where a processor requests a fictionalized value corresponding to an original value, but such a fictionalized value does not exist in the mapping service 301 (FIG. 8). The method commences at block 801 where the first processor 307 (FIG. 8) requests a fictionalized value associated with an original value of a first column that designates a country. For example, assume that the original value is "Ireland". At block 802, the mapping service 301 responds that no mapping exists in the mapping service for the original value. The first processor 307 computes a proposed fictionalized value and sends the proposed fictionalized value to the mapping service 301 (block 803). For example, the proposed fictionalized value may be "France", computed by the first processor 307. Next, at block 804, the mapping service 301 acknowledges that the proposed fictionalized value can be used to mask the original value, and the mapping service 301 updates a mapping table for a corresponding column that includes the original value. The first processor 307 performs a masking of the original value to the fictionalized value on a data set that includes the original value (block 805). The first processor 307 optionally updates a local cache.

Figure 9:
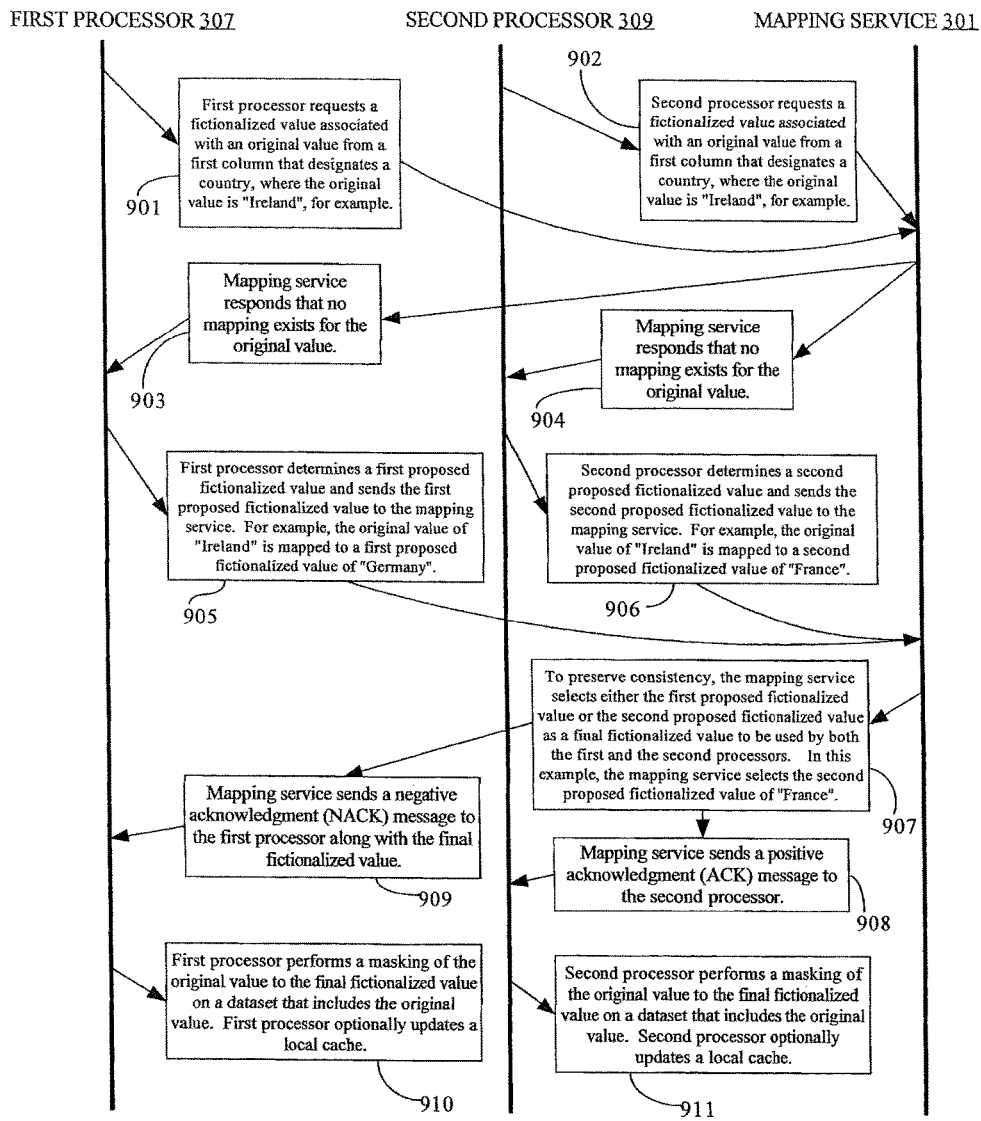
FIG. 9 is a data flow diagram illustrating a sixth exemplary method for performing distributed, consistent utility-preserving data masking.

FIG. 9 is a data flow diagram illustrating a sixth exemplary method for performing distributed, consistent utility-preserving data masking. This method is an example of a processor requesting a fictionalized value when a race condition appears. For example, there are situations where two processors (such as the first processor 307 and the second processor 309, FIG. 9) may request a fictionalized value for the same original value at the same time. If the fictionalized value does not exist on the mapping service 301, then the processors 307, 309 will potentially compute and propose different fictionalized values. However, only one fictionalized value should be kept on the mapping service 301 and used by all processors 307, 309 so as to provide consistent masking.

The procedure of FIG. 9 commences at blocks 901 and 902 which are performed substantially contemporaneously. At block 901, the first processor 307 requests a fictionalized value associated with an original value from a first column. For example, the first column may designate a country, and the original value may be "Ireland". Likewise, at block 902, the second processor 309 requests a fictionalized value associated with the original value from the first column, where the original value is identical to the original value requested in block 901. Thus, the first column may designate a country, and the original value may be "Ireland".

The operational sequence advances to blocks 903 and 904 which may be performed substantially contemporaneously. At block 903, the mapping service 301 responds to the first processor 307 that no mapping exists for the original value. At block 904, the mapping service 301 responds to the second processor 309 that no mapping exists for the original value. The program then continues to blocks 905 and 906. At block 905, the first processor 307 determines a first proposed fictionalized value and sends the proposed fictionalized value to the mapping service 301. For example, the original value of "Ireland" is mapped to a first proposed fictionalized value of "Germany". Likewise, at block 906, the second processor 309 determines a second proposed fictionalized value and sends the proposed fictionalized value to the mapping service 301. For example, the original value of "Ireland" is mapped to a second proposed fictionalized value of "France".

In order to provide consistency, at block 906, the mapping service 301 selects either the first proposed fictionalized value or the second proposed fictionalized value as the final fictionalized value to be used by both the first and second processors 307, 309. In the present example, the mapping service 301 selects the second proposed fictionalized value of "France". At block 908, the mapping service 301 sends a positive acknowledgment (ACK) message to the second processor 309. At block 909, the mapping service 301 sends a negative acknowledgment (NACK) message to the first processor 307 along with the final fictionalized value. The first processor 307 performs a masking of the original value to the final fictionalized value on a data set that includes the original value (block 910). The first processor optionally updates a local cache. The second processor performs a masking of the original value to the final fictionalized value on a data set that includes the original value (block 911). The second processor optionally updates a local cache.

Figure 10:
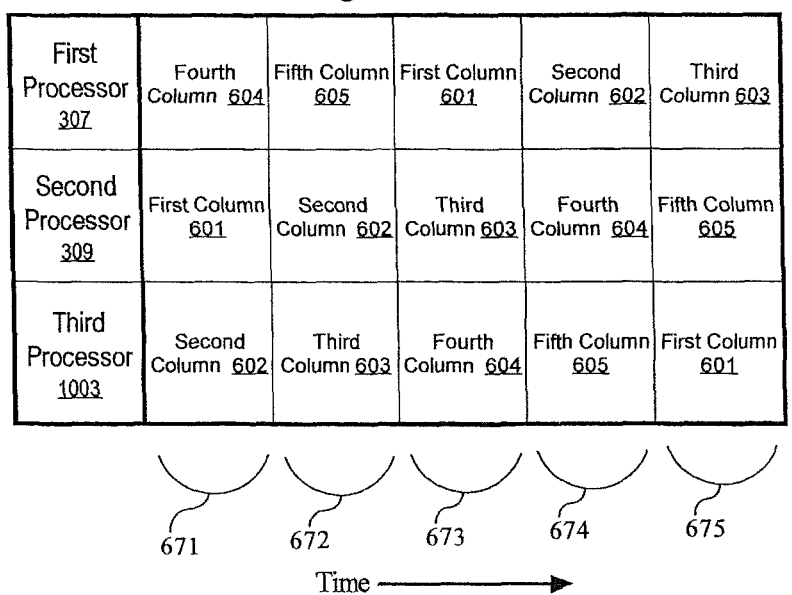
FIG. 10 is a chart illustrating a processing order for processing a plurality of columns of a data set for use with any of the processes of FIGS. 1-2, 4, and 6-9.

FIG. 10 is a chart illustrating a processing order for processing a plurality of columns of a data set for use with any of the processes of FIGS. 1-2, 4, and 6-9. As an additional measure to reduce resource contention, each processor thread applies masking operations in a round-robin fashion starting from a different column of data, such that the minimum number of processors start from the same column of the data set at any given time. A multi-phase communication protocol between processors 307, 309 (FIG. 10) and the consistent mapping service 301 is used to retrieve and update mapping between original and fictionalized values.

The plurality of columns includes the first column 601 (FIGS. 6 and 10), the second column 602, the third column 603, the fourth column 604, and a fifth column 605 (FIG. 10). During a first time slot 671, the first processor 307 processes the fourth column 604, the second processor 309 processes the first column 601, and a third processor 1003 processes the second column 602. Likewise, during a second time slot 672, the first processor 307 processes the fifth column 605, the second processor 309 processes the second column 602, and the third processor 1003 processes the third column 603. Similarly, during a third time slot 673, the first processor 307 processes the first column 601, the second processor 309 processes the third column 603, and the third processor 1003 processes the fourth column 603. During a fourth time slot 674, the first processor 307 processes the second column 602, the second processor 309 processes the fourth column 604, and the third processor 1003 processes the fifth column 605. Then, during a fifth time slot 675, the first processor 307 processes the third column 603, the second processor 309 processes the fifth column 605, and the third processor 1003 processes the first column 601. In this manner, each of the processors 307, 309, and 1003 works on a different column at a given time.

If all of the processors 307, 309, and 1003 processed data in the same column order, there is a high probability that synchronization issues would occur. Two or more processors would send requests for the same column at the same time, several of which may refer to the same original value. According to the processing order scheme of FIG. 10, each processor 307, 309, 1003 processes data by starting from a different column and progressing to other columns in a round-robin sequence.

Figure 11A:
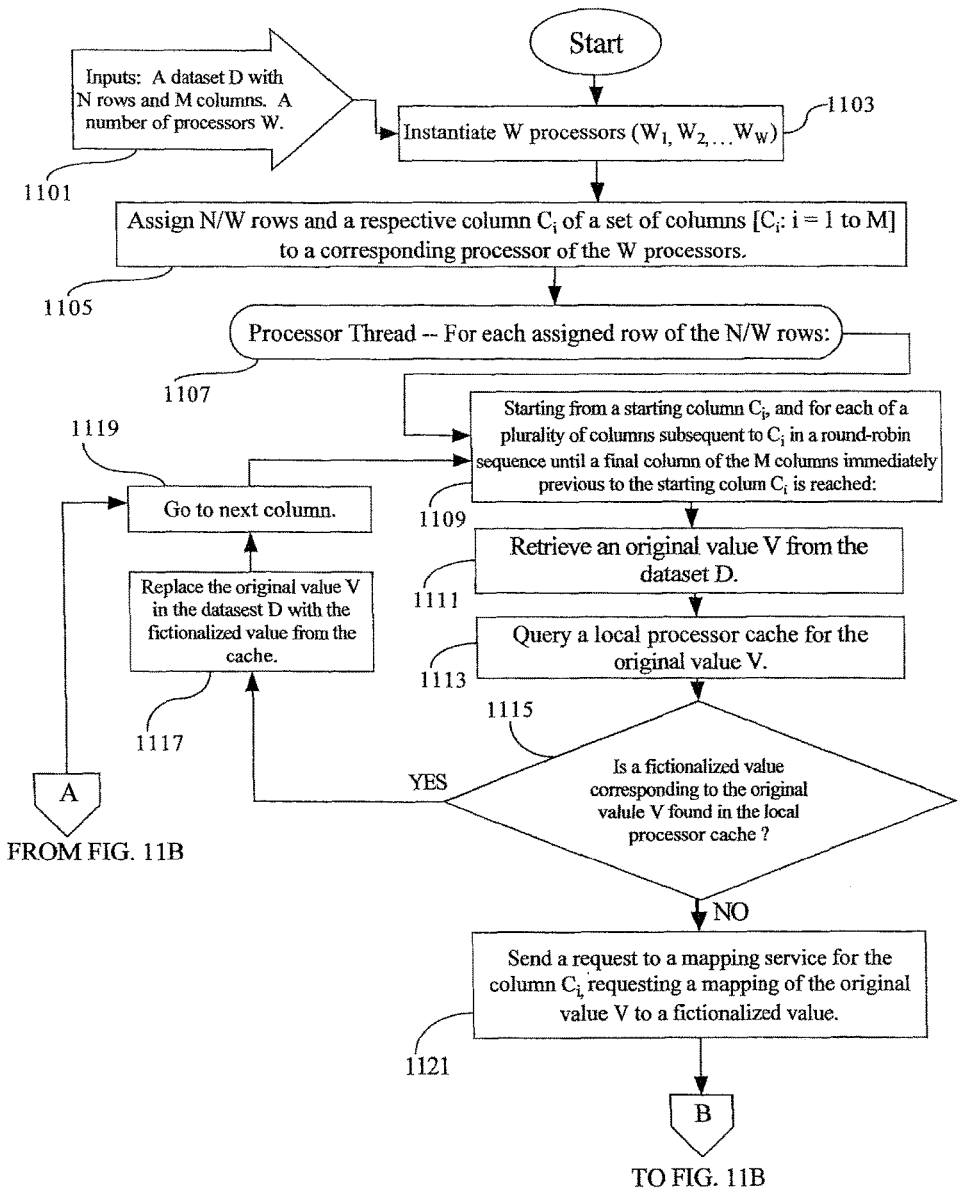
FIGS. 11A and 11B together comprise a flowchart illustrating a seventh exemplary method for performing distributed, consistent utility-preserving data masking.
Figure 11B:
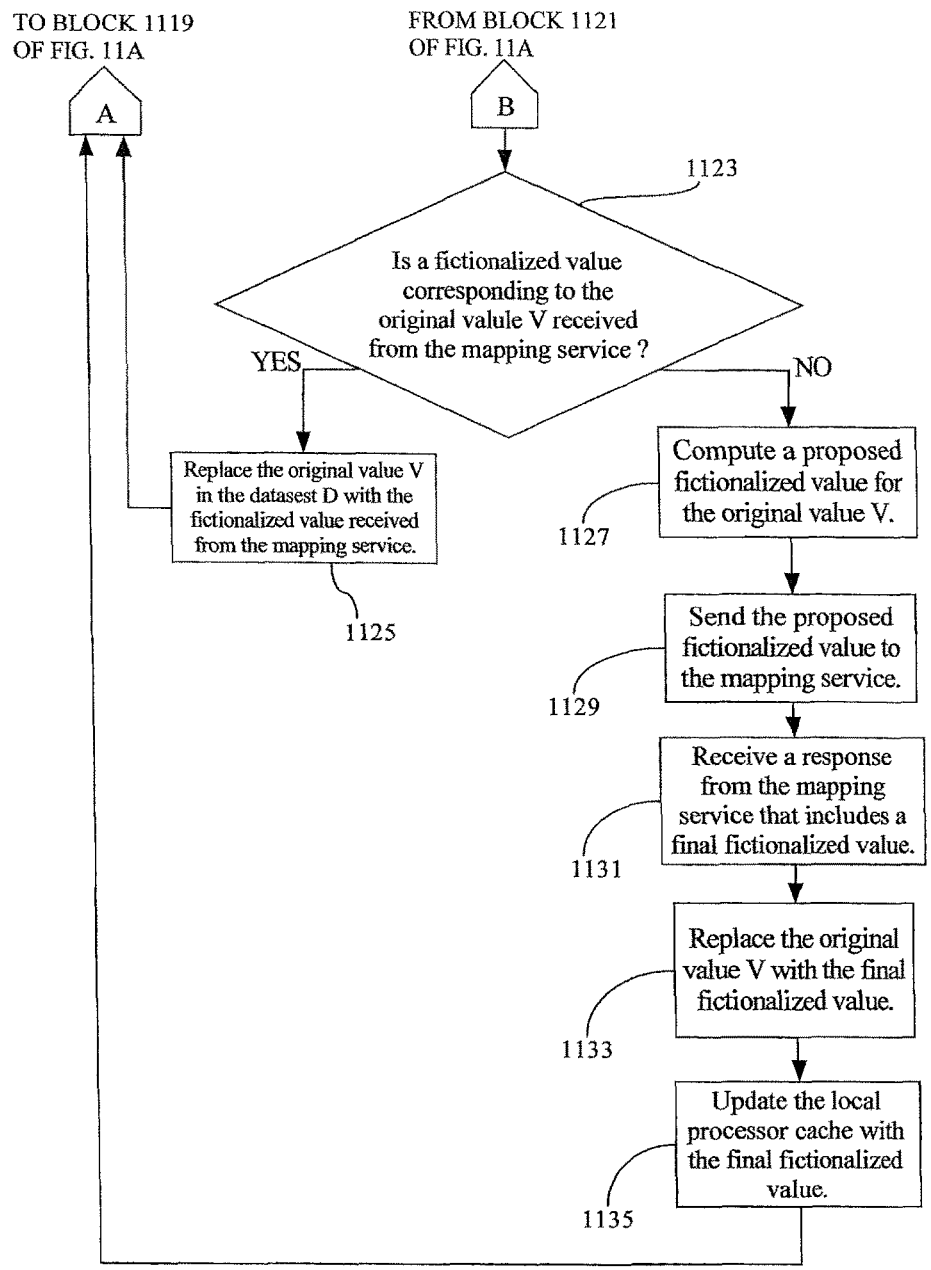

FIGS. 11A and 11B together comprise a flowchart illustrating a seventh exemplary method for performing consistent utility-preserving data masking. At block 1101 (FIG. 11A), the method accepts a set of inputs in the form of a dataset D with N rows and M columns, and a number of processors W. Next, at block 1103, W processors ($W_1$, $W_2$, ... $W_W$) are instantiated. N/W rows and a respective column $C_i$ of a set of columns [$C_i$: i=1 to M] are assigned to a corresponding processor of the W processors (block 1105). A processor thread is commenced at block 1107 for each assigned row of the N/W rows. Starting from a starting column $C_i$, and for each of a plurality of columns subsequent to $C_i$, in a round-robin sequence (block 1109), the following steps (block 1111 of FIG. 11A to block 1135 of FIG. 11B) are performed until a final column of the M columns immediately previous to the starting column $C_i$ is reached.

At block 1111, an original value V is retrieved from the dataset D. A local processor cache is queried for the original value V (block 1113). At block 1115, a test is performed to ascertain whether or not a fictionalized value corresponding to the original value V is found in the local processor cache. If so, the program advances to block 1117 where the original value V is replaced in the dataset D with the fictionalized value from the cache. The program advances to the next column (block 1119), and then the program loops back to block 1109.

The negative branch from block 1115 leads to block 1121 where a request is sent to a mapping service for the column $C_i$ requesting a mapping of the original value V to a fictionalized value. The program continues to block 1123 (FIG. 11B) where a test is performed to ascertain whether or not a fictionalized value corresponding to the original value V is received from the mapping service. If so, the original value V is replaced in the dataset D with the fictionalized value V received from the mapping service (block 1125), and the program loops back to block 1119 of FIG. 11A.

The negative branch from block 1123 (FIG. 11B) leads to block 1127 where a proposed fictionalized value is computed or specified for the original value V. The proposed fictionalized value is sent to the mapping service (block 1129). A response is received from the mapping service that includes a final fictionalized value (block 1131). The original value V is replaced with the final functionalized value (block 1133). The local processor cache is updated with the final fictionalized value (block 1135), and the program then loops back to block 1119 (FIG. 11A).

Illustratively, any of the procedures of FIGS. 1, 2, 4, 6-9, 11A and 11B may be implemented as a service on top of an open source, key-value database such as Redis. Data in a key-value database has two parts: a key and a value. Because Redis can accept keys in a wide range of formats, operations can be executed on a Redis server to reduce a client's workload. An in-memory data structure store may be provided with built-in replication and different levels of on-disk persistence. This approach provides automatic portioning options in cluster environments.

Alternatively, or additionally, any of the procedures of FIGS. 1, 2, 4, 6-9, 11A and 11B may be implemented as a Hadoop™ service using Apache Zookeeper. The mapping service can be implemented as a distributed database such as Hbase. Apache ZooKeeper is an open source file application program interface (API) that allows distributed processes in large systems to synchronize with each other so that all clients making requests receive consistent data.

Figure 12:
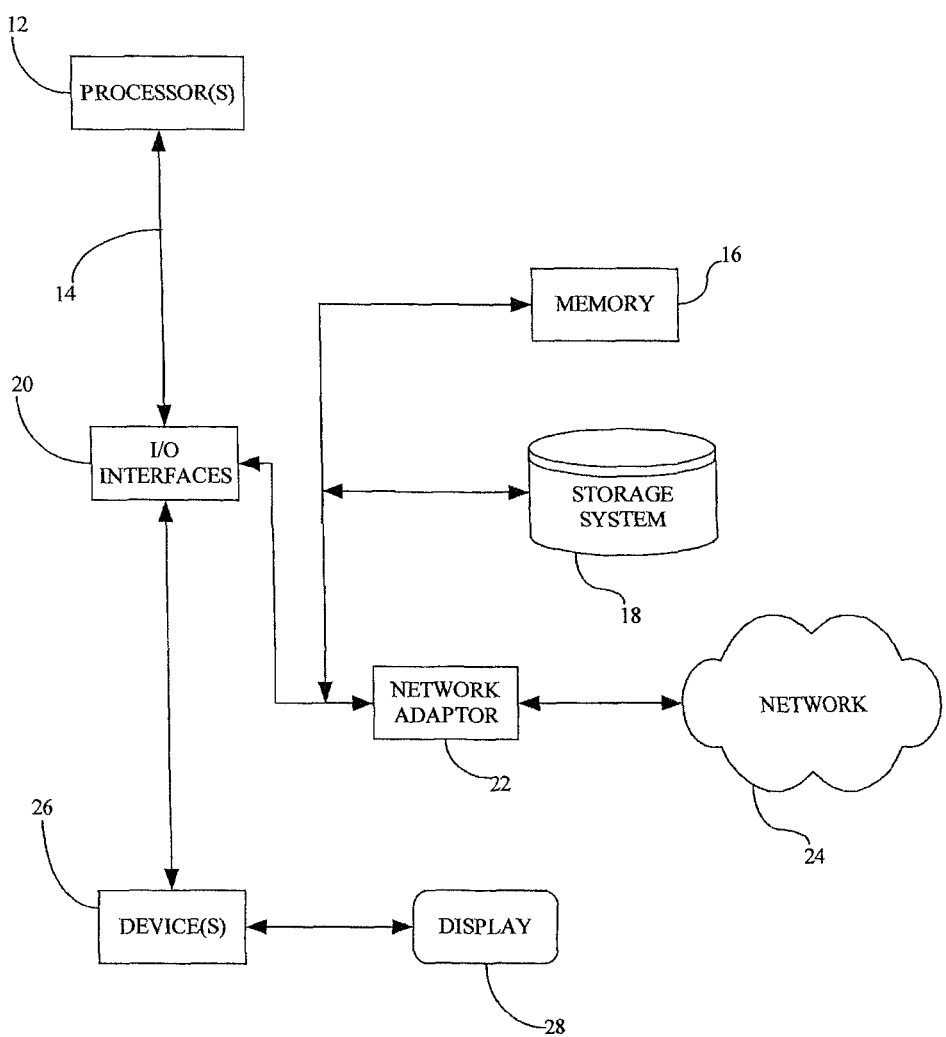
FIG. 12 illustrates a schematic of an exemplary computer or processing system that may implement any of the methods of FIGS. 1-2, 4, 6-9, 11A and 11B, in one set of embodiments of the present disclosure

FIG. 12 illustrates a schematic of an exemplary computer or processing system that may implement any of the methods of FIGS. 1-2, 4, 6-9, 11A and 11B, in one set of embodiments of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 12 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of the computer system may include, but are not limited to, one or more processors or processing units 12, a system memory 16, and a bus 14 that couples various system components including system memory 16 to processor 12. The processor 12 may include a module that performs the methods described herein. The module may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. The computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

The computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, the computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with the computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for performing distributed, consistent utility-preserving data masking, the method comprising:
  retrieving, by a processor among a plurality of processors, an original value from a portion of a data table;
  requesting, by the processor, a mapping service to ascertain whether or not a masking table of the mapping service includes a fictionalized value associated with the original value;
  receiving, by the processor, a response from the mapping service indicating a presence or absence of the fictionalized value associated with the original value in the masking table;
  in response to an absence of the fictionalized value associated with the original value in the masking table, producing, by the processor, a proposed fictionalized value for the original value, wherein the proposed fictionalized value preserves at least one utility function of the original value;
  sending, by the processor, the proposed fictionalized value for the original value to the mapping service in order for the mapping service to update the masking table to include a mapping between the original value and the proposed fictionalized value; and
  applying, by the processor, a data masking operation to the portion of the data table by replacing the original value with the proposed fictionalized value produced by the processor, wherein one or more of the remaining processors among the plurality of processors are configured to replace the original value in the other portions of the data table with the proposed fictionalized value in response to the update of the masking table showing a mapping between the original value and the proposed fictionalized value.

2. The method of claim 1 further comprising, in response to ascertaining a presence of the fictionalized value associated with the original value in the masking table, receiving the fictionalized value from the mapping service; and applying the first data masking operation by replacing the original value with the fictionalized value received from the mapping service.

3. The method of claim 2 further comprising operatively coupling the processor to a local cache configured for storing a mapping between the original value and the fictionalized value.

4. The method of claim 1, wherein the processor is a first processor, the portion of the data table is a first portion of the data table, and the method further comprising:
retrieving, by a second processor of the plurality of processors, the original value from a second portion of the data table, retrieving the proposed fictionalized value corresponding to the original value from the mapping service, and applying a masking operation to the second portion of the data table by replacing the original value of the second portion of the data table with the proposed fictionalized value produced by the first processor.

5. The method of claim 1 wherein applying the data masking operation to the portion of the data table includes replacing all occurrences of the original value in the portion of the data table with the proposed fictionalized value.

6. The method of claim 1, prior to applying the data masking operation, the method further comprising receiving, by the processor, an approval response from the mapping service, wherein the approval response indicates an approval of mapping the proposed fictionalized value to the original value, wherein applying the masking operation to the portion of the data table is performed in response to the receipt of the approval response.

7. The method of claim 1, prior to applying the data masking operation, the method further comprising:
receiving, by the processor, a rejection response from the mapping service, wherein the rejection response indicates a rejection of mapping the proposed fictionalized value to the original value;
receiving, by the processor, a new fictionalized value from the mapping service, wherein the new fictionalized value is produced by another processor among the plurality of processors; and
applying, by the processor, the masking operation to the portion of the data table by replacing the original value with the new fictionalized value.

8. The method of claim 1 further comprising determining a context for the first data masking operation prior to the processor retrieving an original value from a data table, wherein, in response to an identical data value appearing multiple times in a specific context of a plurality of contexts in a first dataset, the identical value is masked consistently across all occurrences of the identical data value, and wherein a context may comprise at least one of a scope of an attribute, a scope of a data session, or a customer-purpose combination.

9. An apparatus for performing distributed, consistent utility-preserving data masking, the apparatus comprising a processor of a plurality of processors configured for communicating with a mapping service;
the processor being configured to:
retrieve an original value from a portion of a data table;
request the mapping service to ascertain whether or not a masking table of the mapping service includes a fictionalized value associated with the original value;
receive a response from the mapping service indicating a presence or absence of the fictionalized value associated with the original value in the masking table;
in response to an absence of the fictionalized value associated with the original value in the masking table, generate a proposed fictionalized value for the original value, wherein the proposed fictionalized value preserves at least one utility function of the original value;
send the proposed fictionalized value for the original value to the mapping service in order for the mapping service to update the masking table to include the proposed fictionalized value; and
apply a first data masking operation to the portion of the data table by replacing the original value with the proposed fictionalized value generated by the processor, wherein one or more of the remaining processors among the plurality of processors are configured to replace the original value in the other portions of the data table with the proposed fictionalized value in response to the update of the masking table showing a mapping between the original value and the proposed fictionalized value.

10. The apparatus of claim 9 wherein the processor is further configured to, in response to ascertaining a presence of the fictionalized value associated with the original value in the masking table, receive the fictionalized value from the mapping service; and applying the first data masking operation by replacing the original value with the fictionalized value received from the mapping service.

11. The apparatus of claim 10 further comprising a local cache, operatively coupled to the processor, and configured for storing a mapping between the original value and the fictionalized value.

12. The apparatus of claim 9, wherein the processor is a first processor, the portion of the data table is a first portion of the data table, and the apparatus further comprising a second processor of the plurality of processors configured for communicating with the mapping service;
the second processor further configured for retrieving the original value from a second portion of the data table, retrieving the proposed fictionalized value corresponding to the original value from the mapping service, and applying a masking operation by replacing the original value in the second portion of the data table with the proposed fictionalized value generated by the first processor.

13. The apparatus of claim 10 wherein the processor is further configured to apply the data masking operation to the portion of the data table by replacing all occurrences of the original value in the portion of the data table with the proposed fictionalized value.

14. The apparatus of claim 9 wherein the processor is further configured for determining a context for the first data masking operation prior to the processor retrieving an original value from a data table, wherein, in response to an identical data value appearing multiple times in a specific context of a plurality of contexts in a first dataset, the identical value is masked consistently across all occurrences of the identical data value, and wherein a context may comprise at least one of a scope of an attribute, a scope of a data session, or a customer-purpose combination.

15. A computer program product for performing distributed, consistent utility-preserving data masking, the computer program product comprising a non-transitory computer-readable storage medium having a computer-readable program stored therein, wherein the computer-readable program, when executed on a computer system comprising at least one processor, causes each of the at least one processor to perform:

retrieving an original value from a portion of a data table;

requesting a mapping service to ascertain whether or not a masking table of the mapping service includes a fictionalized value associated with the original value;

receiving a response from the mapping service indicating a presence or absence of the fictionalized value associated with the original value in the masking table;

in response to an absence of the fictionalized value associated with the original value in the masking table, generating a proposed fictionalized value for the original value wherein the proposed fictionalized value preserves at least one utility function of the original value;

sending, by the processor, the proposed fictionalized value for the original value to the mapping service in order for the mapping service to update the masking table to include a mapping between the proposed fictionalized value and the original value in the masking table; and applying a first data masking operation to the portion of the data table by replacing the original value with the proposed fictionalized value, wherein one or more of the remaining processors among the at least one processors are each configured to replace the original value in other portions of the data table with the proposed fictionalized value in response to the update of the masking table showing a mapping between the original value and the proposed fictionalized value.

16. The computer program product of claim 15 further comprising instructions for, in response to ascertaining a presence of the fictionalized value associated with the original value in the masking table, receiving the fictionalized value from the mapping service; and applying the first data masking operation by replacing the original value with the fictionalized value received from the mapping service.

17. The computer program product of claim 16 further comprising instructions for operatively coupling each of the at least one processors to a respective local cache configured for storing a mapping between the original value and the fictionalized value.

18. The computer program product of claim 15, wherein the portion of the data table is a first portion of the data table, and wherein the computer program product further comprises instructions for another processor among the at least one processors to retrieve the original value from a second portion of the data table, to retrieve the proposed fictionalized value corresponding to the original value from the mapping service, and applying a masking operation to the second portion of the data table by replacing the original value in the second portion of the data table with the proposed fictionalized value.

19. The computer program product of claim 16 further comprising instructions wherein, upon receiving the proposed fictionalized value from the mapping service, the processor masks all occurrences of the original value in the portion of the data table with the proposed fictionalized value.

20. The computer program product of claim 15 further comprising instructions for determining a context for the first data masking operation prior to the first processor retrieving an original value from a data table, wherein, in response to an identical data value appearing multiple times in a specific context of a plurality of contexts in a first dataset, the identical value is masked consistently across all occurrences of the identical data value, and wherein a context may comprise at least one of a scope of an attribute, a scope of a data session, or a customer-purpose combination.

* * * * *